United States Patent
Wu

(10) Patent No.: US 10,459,736 B2
(45) Date of Patent: Oct. 29, 2019

(54) ELECTRONIC DEVICE AND HALF-SUSPEND CONTROLLING METHOD APPLIED THEREIN

(71) Applicant: Chiun Mai Communication Systems, Inc., New Taipei (TW)

(72) Inventor: Cheng-Han Wu, New Taipei (TW)

(73) Assignee: Chiun Mai Communication Systensms, Inc., New Taipei (TW)

( * ) Notice: Subject to any disclaimer, the term of this patent is extended or adjusted under 35 U.S.C. 154(b) by 246 days.

(21) Appl. No.: 15/636,771

(22) Filed: Jun. 29, 2017

(65) Prior Publication Data

US 2018/0004542 A1 Jan. 4, 2018

(30) Foreign Application Priority Data

Jul. 1, 2016 (CN) .......................... 2016 1 0503111

(51) Int. Cl.
| | | |
|---|---|---|
| G06F 1/32 | (2019.01) | |
| G06F 9/4401 | (2018.01) | |
| G06F 1/3228 | (2019.01) | |
| G06F 1/3234 | (2019.01) | |
| H04N 21/443 | (2011.01) | |
| G06F 9/44 | (2018.01) | |
| G06F 1/3206 | (2019.01) | |
| G06F 1/3203 | (2019.01) | |

(Continued)

(52) U.S. Cl.
CPC .............. *G06F 9/4418* (2013.01); *G06F 1/32* (2013.01); *G06F 1/3203* (2013.01); *G06F 1/325* (2013.01); *G06F 1/3206* (2013.01); *G06F 1/3228* (2013.01); *G06F 1/3234* (2013.01); *G06F 1/3246* (2013.01); *G06F 1/3265* (2013.01); *G06F 1/3287* (2013.01); *G06F 9/44* (2013.01); *H04N 21/4431* (2013.01); *H04N 21/4436* (2013.01); *Y02D 10/10* (2018.01); *Y02D 10/15* (2018.01); *Y02D 10/153* (2018.01); *Y02D 50/20* (2018.01)

(58) Field of Classification Search
None
See application file for complete search history.

(56) References Cited

U.S. PATENT DOCUMENTS

| | | | | |
|---|---|---|---|---|
| 5,315,695 A | * | 5/1994 | Saito .................... | G09G 3/3406 345/102 |
| 6,597,339 B1 | * | 7/2003 | Ogawa ................. | G09G 3/3406 345/102 |

(Continued)

FOREIGN PATENT DOCUMENTS

| | | |
|---|---|---|
| CN | 104820564 A | 8/2015 |
| CN | 105511589 A | 4/2016 |

*Primary Examiner* — Tanh Q Nguyen
(74) *Attorney, Agent, or Firm* — ScienBiziP, P.C.

(57) ABSTRACT

An electronic device includes a display and a processor. The display displays a present application program in a first brightness. When the electronic device in normal-use status receives no user input for a predetermined idle time period, the processor determines whether the present application program is in a half-suspend list. If yes, the processor controls the electronic device to enter a half-suspend status and keep the present application program running, but controls the display to display the present application program in a second brightness, which is less bright than the first brightness. A half-suspend controlling method of the electronic device is also provided.

20 Claims, 4 Drawing Sheets

(51) Int. Cl.
*G06F 1/3287* (2019.01)
*G06F 1/3246* (2019.01)

(56) References Cited

U.S. PATENT DOCUMENTS

| | | | |
|---|---|---|---|
| 8,397,087 B1* | 3/2013 | Gardner | G06F 1/329 |
| | | | 713/300 |
| 2008/0165115 A1* | 7/2008 | Herz | G06F 1/3203 |
| | | | 345/102 |
| 2014/0089948 A1* | 3/2014 | Li | G06F 9/445 |
| | | | 719/328 |
| 2015/0261284 A1* | 9/2015 | Lee | G06F 1/3234 |
| | | | 713/323 |
| 2015/0301588 A1* | 10/2015 | Jeong | G06F 1/3287 |
| | | | 713/323 |
| 2015/0346987 A1* | 12/2015 | Ren | G06F 1/32 |
| | | | 345/589 |
| 2016/0209907 A1* | 7/2016 | Han | G06F 1/3209 |
| 2016/0253187 A1* | 9/2016 | Kim | G06F 9/44505 |
| | | | 719/320 |
| 2017/0235357 A1* | 8/2017 | Leung | G06F 1/3212 |
| | | | 713/310 |
| 2018/0232113 A1* | 8/2018 | Ham | G06F 15/16 |

* cited by examiner

ELECTRONIC DEVICE AND HALF-SUSPEND CONTROLLING METHOD APPLIED THEREIN

FIELD

The subject matter herein generally relates to an electronic device that can be controlled to enter a half-suspended status and a half-suspend controlling method.

BACKGROUND

Many electronic devices may install several application programs, and some of the application programs may be more active and need continuity of use, such as chatting application programs and gaming application programs. Typically, electronic device may enter a screen locked status or a sleep mode when not operated for a predetermined period of time. In the screen locked status or the sleep mode, internet data may be limited to these application programs, which may cause chatting messages to linger or downloadings to be interrupted, and this provides a bad user experience.

BRIEF DESCRIPTION OF THE DRAWINGS

Many aspects of the disclosure can be better understood with reference to the following figures. The components in the figures are not necessarily drawn to scale, the emphasis instead being placed upon clearly illustrating the principles of the disclosure. Moreover, in the drawings, like reference numerals designate corresponding parts throughout several views.

DETAILED DESCRIPTION

Figure 1:
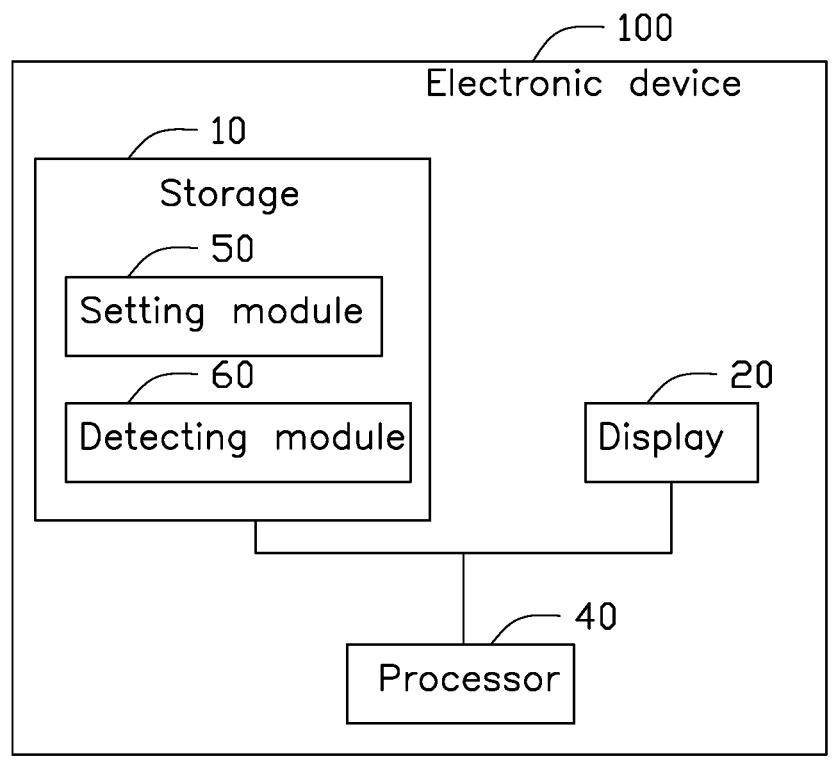
FIG. 1 is a functional block diagram of an exemplary embodiment of an electronic device.

It will be appreciated that for simplicity and clarity of illustration, where appropriate, reference numerals have been repeated among the different figures to indicate corresponding or analogous elements. In addition, numerous specific details are set forth in order to provide a thorough understanding of the exemplary embodiments described herein. However, it will be understood by those of ordinary skill in the art that the exemplary embodiments described herein can be practiced without these specific details. In other instances, methods, procedures, and components have not been described in detail so as not to obscure the related relevant feature being described. Also, the description is not to be considered as limiting the scope of the exemplary embodiments described herein. The drawings are not necessarily to scale and the proportions of certain parts may be exaggerated to better illustrate details and features of the present disclosure.

The term "comprising:" when utilized, means "including, but not necessarily limited to"; it specifically indicates open-ended inclusion or membership in the so-described combination, group, series and the like.

The term "module" refers to logic embodied in computing or firmware, or to a collection of software instructions, written in a programming language, such as, Java, C, or assembly. One or more software instructions in the modules may be embedded in firmware, such as in an erasable programmable read only memory (EPROM). The modules described herein may be implemented as either software and/or computing modules and may be stored in any type of non-transitory computer-readable medium or other storage device. Some non-limiting examples of non-transitory computer-readable media include CDs, DVDs, BLU-RAY™, flash memory, and hard disk drives. The term "comprising:" means "including, but not necessarily limited to"; it specifically indicates open-ended inclusion or membership in a so-described combination, group, series, and the like.

FIG. 1 illustrates an exemplary embodiment of an electronic device 100. The electronic device 100 can be, but is not limited to, a mobile phone, a tablet computer, a personal digital assistant (PDA), a personal computer or any other electronic device in which several application programs are installed. The electronic device 100 runs the application programs.

The electronic device 100 includes a storage 10, a display 20, and a processor 40. The storage 10 includes a setting module 50 and a detecting module 60. The storage 10 can be an internal storage device, such as a flash memory, a random access memory (RAM) for temporary storage of parameters, and/or a read-only memory (ROM) for permanent storage of parameters. The setting module 50 and the detecting module 60 can comprise computerized instructions in the form of one or more computer-readable programs that can be stored in a non-transitory computer-readable medium, for example the storage 10, and executed by the processor 40 of the electronic device 100. The processor 40 can be a central processing unit (CPU), a microprocessor, or other data processor chip that performs functions of the electronic device 100. The electronic device 100 includes a normal-use status, a sleep status, and a half-suspend status.

The display 20 displays the application programs and includes different display modes according to various statuses, such as the normal-use status, the sleep status, and the half-suspend status. In at least one embodiment, when the electronic device 100 is in the normal-use status, the display 20 displays information in a first brightness. When the electronic device 100 is in the half-suspend status, the display 20 displays information in a second brightness. The second brightness is less bright than the first brightness. When the electronic device 100 is in the sleep status, the display 20 is powered off. In at least one embodiment, the display 20 can be a touch-control display, the second brightness can be a lowest brightness of the display 20 or any other brightness that is less bright than the first brightness.

The setting module 50 presets a half-suspend list. The half-suspend list includes at least one application program of the electronic device 100. The setting module 50 presets a predetermined idle time period during which the electronic device 100 is not used. When the electronic device 100 is not used for the predetermined idle time period, which means that the electronic device 100 does not receive any input from the user during the predetermined idle time period, the electronic device 100 enters the sleep status or the half-suspend status. Additionally, the setting module 50 provides the user with a manual for adding or removing application programs into/from the half-suspend list.

When the electronic device 100 in the normal-use status without user input for the predetermined idle time period, the detecting module 60 can detect an application program that the display 20 is displaying (hereinafter a present application program). The detecting module 60 can further detect application programs which frequently enter the sleep status from the normal-use status to determine these application programs as candidates for the half-suspend list.

The processor 40 controls the electronic device 100 to enter the half-suspend status or the sleep status from the normal-use status. When the electronic device 100 in the normal-use status is without user input for the predetermined idle time period and the application program that the display 20 is displaying is in the half-suspend list, the processor 40 controls the electronic device 100 to enter the half-suspend status. The present application program is kept running and the display 20 is controlled to display the application program in the second brightness. Meanwhile, the processor 40 stops other application programs from running.

The electronic device 100 includes several electronic elements. When the electronic device 100 is in the normal-use status, all of the electronic elements are activated. When the electronic device 100 is in the sleep status, all of the electronic elements are shut down. In one embodiment, when the electronic device 100 is in the half-suspend status, all of the electronic elements are shut down. In another embodiment, when the electronic device 100 is in the half-suspend status, all of the electronic elements can be divided into a first group and a second group, and the first group of the electronic elements is shut down and the second group of the electronic elements is working. For instance, the second group of the electronic elements comprises those used by the present application program, and the first group of the electronic elements is not used by the present application program. The second group of the electronic elements can be a camera module which is used by a camera application program or a data network module which is used by an instant messaging application program, etc.

The setting module 50 can further adjust an operating setting of the electronic device 100 in the half-suspend status and set a wake-up manner for the electronic device 100 to wake up from the half-suspend status into the normal-use status. For instance, the electronic device 100 includes at least one physical button. The physical button may receive operation when the electronic device 100 is in the half-suspend status to adjust the brightness outputted by the display 20. For instance, the physical button can be a volume button, when the volume button receives an increase volume operation, the electronic device 100 increases the brightness outputted by the display 20; when the volume button receives a decrease volume operation, the electronic device 100 decreases the brightness outputted by the display 20. The wake-up manner of the half-suspend status of the electronic device 100 includes, but is not limited to, pressing a power button of the electronic device 100, touching the display 20, and detecting, by a proximity sensor of the electronic device 100, a change of a distance between the electronic device 100 and the user.

The setting module 50 further provides a setting item for setting whether to activate a half-suspend function, so as to enable the electronic device 100 to enter the half-suspend status. The setting item can be displayed by the display 20, and the user can activate the half-suspend function by selecting the setting item by touching the display 20. When the half-suspend function is activated by the user, the electronic device 100 in the normal-use status determines whether the present application program displayed by the display 20 is in the half-suspend list, and further determines whether the electronic device 100 is commanded to enter the half-suspend status. When the half-suspend function is not selected by the user, the electronic device 100 in the normal-use status may be without user input for the predetermined idle time period, then the processor 40 controls the electronic device 100 to enter the sleep status.

Figure 2:
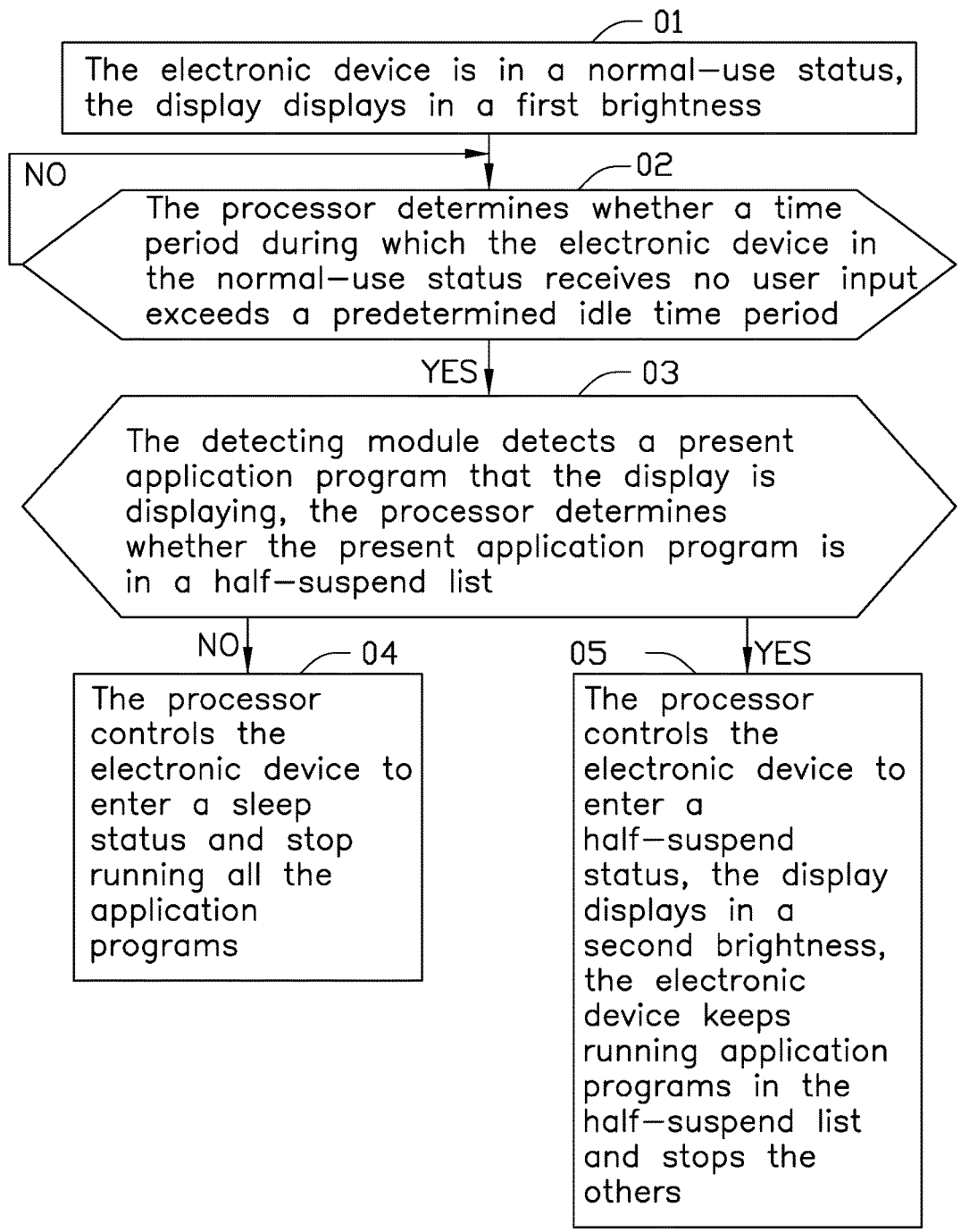
FIG. 2 is a flow chart of a first exemplary embodiment of a half-suspend controlling method for the electronic device of FIG. 1.

FIG. 2 illustrates a flowchart of a first exemplary embodiment of a half-suspend controlling method of the electronic device 100. In at least one embodiment, the method is performed by execution of computer-readable software program codes or instructions by at least one processor of the electronic device.

Referring to FIG. 2, a flowchart is presented in accordance with a first exemplary embodiment. The method is provided by way of example, as there are a variety of ways to carry out the method. The method described below can be carried out using the configurations illustrated in FIG. 1, for example, and various elements of these figures are referenced in explaining method. Each block shown in FIG. 2 represents one or more processes, methods, or subroutines, carried out in the method. Furthermore, the illustrated order of blocks is illustrative only and the order of the blocks can be changed. Additional blocks can be added or fewer blocks can be utilized without departing from this disclosure. The example method can begin at block S01.

At block 01, the electronic device 100 is in a normal-use status, the display 20 displays at least one application program in a first brightness. The electronic device 100 runs several application programs.

At block 02, the processor 40 determines whether a time period during which the electronic device 100 in the normal-use status receives no user input exceeds a predetermined idle time period. If not exceeding the predetermined idle time period, the procedure returns to block S02 and repeats the block S02; if exceeding the predetermined idle time period, the procedure goes to block S03.

At block 03, the detecting module 60 detects a present application program that the display 20 is displaying, the processor 40 determines whether the present application program is in a half-suspend list. If the present application program is not in the half-suspend list, the procedure goes to block S04; if the present application program is in the half-suspend list, the procedure goes to block S05.

At block 04, the processor 40 controls the electronic device 100 to enter a sleep status. In at least one embodiment, the electronic device 100 stops running all the application programs in the sleep status.

At block 05, the processor 40 controls the electronic device 100 to enter a half-suspend status, the display 20 displays the present application program in a second brightness. At this time, the display 20 keeps displaying the present application program and running application programs in the half-suspend list, and stops running other application programs not in the half-suspend list.

In another embodiment, when the electronic device 100 enters the half-suspend status, the processor 40 keeps running the present application program and stops running all other application programs. In other words, the electronic device 100 in the half-suspend status merely keeps running the present application program and stops running all other application programs, no matter whether the other application programs are in the half-suspend list. Therefore, the electronic device 100 can save more power in this embodiment.

Figure 3:
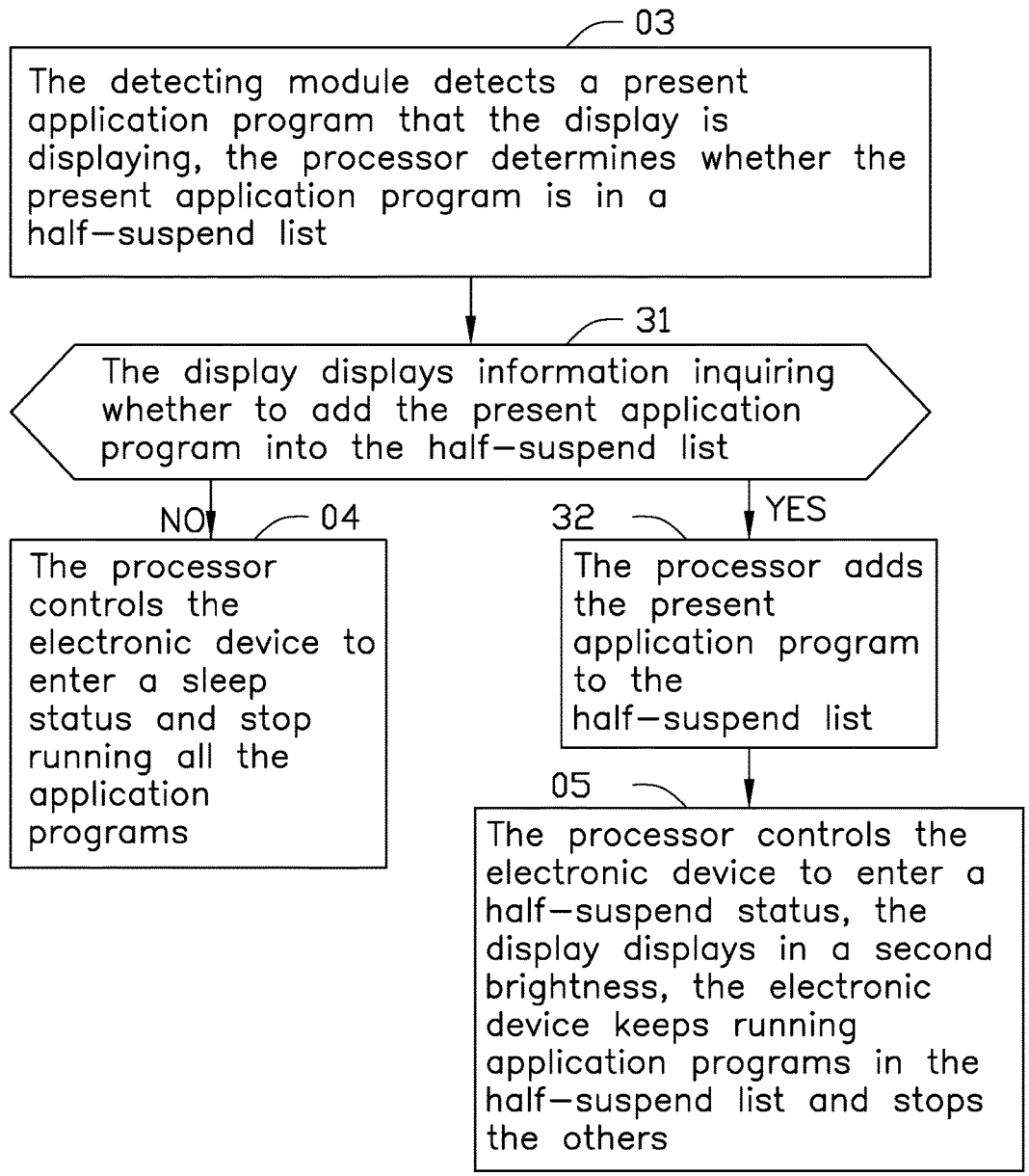
FIG. 3 is a flow chart of a second exemplary embodiment of a half-suspend controlling method for the electronic device of FIG. 1.

FIG. 3 illustrates a flowchart of a second exemplary embodiment of a half-suspend controlling method of the electronic device 100. In the block S03 of the half-suspend controlling method of the first exemplary embodiment, when the present application program is not in the half-suspend list is determined, the half-suspend controlling method further includes procedures as follows:

At block 31, the display 20 displays information inquiring whether to add the present application program into the half-suspend list. If not adding the present application program is selected by the user, the procedure goes to block S04; if adding the present application program is selected by the user, the procedure goes to block S32.

At block 32, the processor 40 adds the present application program to the half-suspend list. The procedure goes to block S05.

Figure 4:
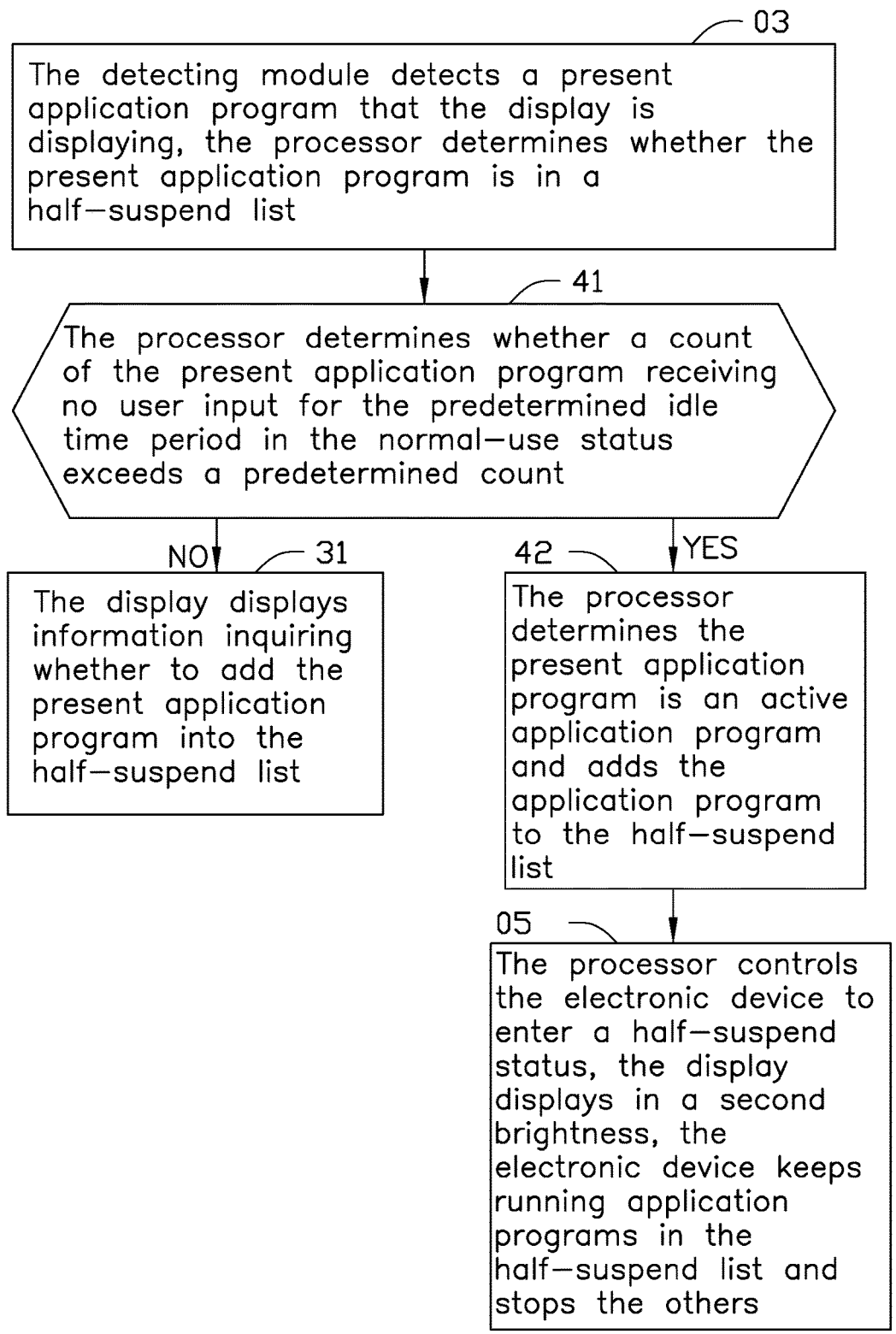
FIG. 4 is a flow chart of a third exemplary embodiment of a half-suspend controlling method for the electronic device of FIG. 1.

FIG. 4 illustrates a flowchart of a third exemplary embodiment of a half-suspend controlling method of the electronic device 100. In the block S03 of the half-suspend controlling method of the first exemplary embodiment, when the present application program is not in the half-suspend list is determined, the half-suspend controlling method further includes procedures as follows:

At block 41, the processor 40 determines whether a count of the present application program receiving no user input for the predetermined idle time period in the normal-use status exceeds a predetermined count. The predetermined count can be such as ten times. If the count does not exceed the predetermined count, the procedure goes to block S31 of FIG. 3; if the count exceeds the predetermined count, the procedure goes to block S42.

At block 42, the processor 40 determines the present application program is an active application program and adds the application program to the half-suspend list. The procedure goes to block S05.

The electronic device 100 establishes the half-suspend list, so that when the electronic device 100 in the normal-use status receives no user input for the predetermined idle time period, the electronic device 100 automatically enters the half-suspend status and keeps running the application programs in the half-suspend list, which avoids interrupting some of the functions for these application programs. Additionally, the display 20 displays at least one application programs in a lower brightness and the electronic device 100 stops running some electronic elements, which may save power for the electronic device 100.

It is believed that the exemplary embodiments and their advantages will be understood from the foregoing description, and it will be apparent that various changes may be made thereto without departing from the scope of the disclosure or sacrificing all of its advantages. The examples herein described are mere illustrative exemplary embodiments of the disclosure.

What is claimed is:

1. An electronic device capable of running several application programs, the electronic device comprising:
   a plurality of electronic elements activated when the electronic device is in a normal-use status;
   a display configured to display a present application program in a first brightness; and
   a processor configured to establish a half-suspend list, the half-suspend list comprising at least one application program;
   wherein when the electronic device in the normal-use status receives no user input for a predetermined idle time period, the processor determines whether the present application program is in the half-suspend list;
   wherein if the present application program is in the half-suspend list, the processor controls the electronic device to enter a half-suspend status and keep running the present application program, and the display displays the present application program in a second brightness; and
   wherein the second brightness is less bright than the first brightness, and the electronic elements are partially kept activated in the half-suspend status.

2. The electronic device as claimed in claim 1, wherein the second brightness is a lowest brightness of the display.

3. The electronic device as claimed in claim 1, wherein when the electronic device is in the half-suspend status, a group of electronic elements used by the present application program is kept activated, and other electronic elements not used by the present application program are shut down.

4. The electronic device as claimed in claim 1, wherein when the electronic device in the normal-use status receives no user input for the predetermined idle time period, the processor determines the present application program is not in the half-suspend list, the processor controls the electronic device to enter a sleep status, the display is shut down, and all the electronic elements are shut down.

5. The electronic device as claimed in claim 1, wherein when the electronic device in the normal-use status receives no user input for the predetermined idle time period, the processor determines the present application program is not in the half-suspend list, the display displays information inquiring whether to add the present application program into the half-suspend list; and wherein if not adding the present application program is selected, the processor controls the electronic device to enter the sleep status.

6. The electronic device as claimed in claim 1, wherein when the electronic device in the normal-use status receives no user input for the predetermined idle time period, the processor determines the present application program is not in the half-suspend list, the display displays information inquiring whether to add the present application program into the half-suspend list, if adding the present application program is selected, the processor adds the present application program to the half-suspend list and controls the electronic device to enter the half-suspend status.

7. The electronic device as claimed in claim 1, wherein when the electronic device in the normal-use status receives no user input for the predetermined idle time period, the processor determines the present application program is not in the half-suspend list, the processor determines a count of the present application program receiving no user input for the predetermined idle time period in the normal-use status does not exceed a predetermined count, and the display displays information inquiring whether to add the present application program into the half-suspend list.

8. The electronic device as claimed in claim 1, wherein when the electronic device in the normal-use status receives no user input for the predetermined idle time period, the processor determines the present application program is not in the half-suspend list, the processor determines a count of the present application program receiving no user input for the predetermined idle time period in the normal-use status exceeds a predetermined count, and the processor adds the present application program into the half-suspend list and controls the electronic device to enter the half-suspend status.

9. The electronic device as claimed in claim 1, further comprising at least one physical button, wherein the at least one physical button receives operation when the electronic device is in the half-suspend status to adjust brightness outputted by the display.

10. The electronic device as claimed in claim 9, wherein the at least one physical button receives operation when the electronic device is in the sleep status to wake up the electronic device.

11. The electronic device as claimed in claim 1, further comprising a setting module, wherein the setting module presets the half-suspend list and the predetermined idle time period, and the setting module provides a manual for adding or removing application programs into/from the half-suspend list.

12. A half-suspend controlling method of an electronic device, the method comprising:
  running a plurality of application programs in a normal-use status, and displaying, by a display, a present application program in a first brightness;
  establishing a half-suspend list comprising at least one application program;
  determining whether a time period during which the electronic device in the normal-use status receives no user input exceeds a predetermined idle time period;
  determining whether the present application program is in the half-suspend list when the time period exceeds the predetermined idle time period;
  controlling the electronic device to enter a sleep status when the present application program is not in the half-suspend list; and
  when the present application program is in the half-suspend list, controlling the electronic device to enter a half-suspend status and keep running the present application program, and displaying, by the display, the present application program in a second brightness, wherein the second brightness is less bright than the first brightness.

13. The half-suspend controlling method as claimed in claim 12, when it is determined that the present application program is not in the half-suspend list, the method further comprising:
  displaying information inquiring whether to add the present application program into the half-suspend list;
  controlling the electronic device to enter the sleep status when not adding the present application program is selected; and
  when adding the present application program is selected, adding the present application program into the half-suspend list, controlling the electronic device to enter the half-suspend status, keeping running the present application program, and displaying the present application in the second brightness.

14. The half-suspend controlling method as claimed in claim 13, when it is determined that the present application program is not in the half-suspend list, the method further comprising:
  determining whether a count of the present application program receiving no user input for the predetermined idle time period in the normal-use status exceeds a predetermined count;
  displaying information inquiring whether to add the present application program into the half-suspend list when the count does not exceed the predetermined count; and
  when the count exceeds the predetermined count, adding the application program to the half-suspend list, controlling the electronic device to enter the half-suspend status, keeping running the present application program, and displaying the present application program in the second brightness.

15. The half-suspend controlling method as claimed in claim 12, the method further comprising:
  when the present application program is in the half-suspend list, keeping a group of electronic elements used by the present application program activated.

16. The half-suspend controlling method as claimed in claim 12, wherein the second brightness is a lowest brightness of the display.

17. The half-suspend controlling method as claimed in claim 12, wherein when the electronic device is in the half-suspend status, a group of electronic elements used by the present application program is kept activated, and other electronic elements not used by the present application program are shut down.

18. The half-suspend controlling method as claimed in claim 12, further comprising:
  receiving operation on at least one physical button of the electronic device when the electronic device is in the half-suspend status and adjusting brightness outputted by the display.

19. The half-suspend controlling method as claimed in claim 18, further comprising:
  receiving operation on the at least one physical button when the electronic device is in the sleep status and waking up the electronic device.

20. The half-suspend controlling method as claimed in claim 12, further comprising:
  presetting the half-suspend list and the predetermined idle time period; and
  adding or removing application programs into/from the half-suspend list.

* * * * *